Patented Sept. 20, 1932

1,878,654

UNITED STATES PATENT OFFICE

GEORGE STAFFORD WHITBY, OF MONTREAL, QUEBEC, CANADA, ASSIGNOR, BY MESNE ASSIGNMENTS, TO THE ROESSLER & HASSLACHER CHEMICAL COMPANY, A CORPORATION OF DELAWARE

PROCESS OF AND COMPOUND FOR TREATING RUBBER

No Drawing.   Application filed August 2, 1929.   Serial No. 383,176.

This invention relates to a new class of compounds or products and their use in the manufacture of rubber products of superior quality.

My new compounds are made by the reaction between a metal salt of a mercapto thiazole, or a substituted mercapto thiazole, and the addition product of a benzyl halide to hexamethylene tetramine. For example, I react an alkali metal salt of mercapto-benzo thiazole with hexamethylene tetramine benzyl chloride to obtain a new compound which I believe to be the hexamethylene tetramine benzyl ester of mercapto benzo thiazole.

One object of my invention is to accelerate the rate of vulcanization of rubber and sulphur mixtures, at the same time producing a vulcanized product having improved tensile strength and other desirable mechanical properties. This object is attained through the use of my new compounds, and particularly by the use of the reaction product of hexamethylene tetramine benzyl chloride with a salt of mercapto benzo thiazole, as described more fully below.

The hexamethylene-tetramine benzyl ester of mercapto benzo thiazole has the advantage of being a solid crystalline substance which can be readily and easily incorporated into a rubber mix. Furthermore, its melting point is sufficiently high so that it remains a solid, even in hot weather, and does not agglomerate or become sticky as do many other accelerators. Other properties of my accelerator which make it desirable are, that it can be used at both high and low temperatures; its acceleration of vulcanization is very rapid, it works well with carbon black stocks, so called non-blooming products can easily be made by its use, and it can be made at low cost.

The following example will serve to illustrate the process of making my improved accelerator;—an aqueous solution of 9.5 grams of the sodium salt of mercaptobenzo thiazole was mixed with an aqueous solution of 13.3 grams of the benzyl chloride addition product of hexamethylenetetramine. After stirring for some time, the turbid mixture became clear and 20 grams of a light yellow solid separated. This crude product was recrystallized from alcohol giving a pale yellow crystalline powder which melted at 140° C.

Other salts of mercapto benzothiazole may be used, with the benzyl chloride addition product, but I prefer the use of the relatively inexpensive and easily prepared sodium salt.

The product of this reaction has a definite melting point and I believe the reaction which takes place may be represented by the following equation:

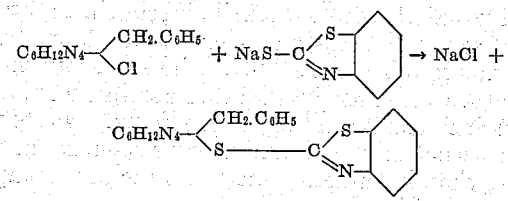

I therefore refer to this new product as the hexamethylenetetramine benzyl ester of mercapto benzothiazole; that is, hexamethylenetetramine benzyl mercapto benzothiazole.

The following examples illustrate the use of the product of the above reaction in the vulcanization of rubber:

Example I

| Ingredients | Parts |
|---|---|
| Rubber | 100 |
| Zinc oxide | 5 |
| Sulphur | 5 |
| Hexamethylenetetramine benzyl mercaptobenzo thiazole | ¾ |

After milling these ingredients together, the mix was vulcanized at a temperature corresponding to steam at 20 lbs. pressure. The resulting vulcanized product when tested gave the following results:

| Cure | Stretch | Set | 600 per cent elongation | Tensile |
|---|---|---|---|---|
| Minutes | | | | Lbs./sq.in. |
| 20 | 810 | 20 | 1100 | 4009 |
| 40 | 760 | 22 | 1100 | 4436 |

*Example II*

This example illustrates the use of my accelerator in tire tread stock.

| Ingredients | Parts |
|---|---|
| Smoked sheet rubber | 100 |
| Carbon black | 35 |
| Zinc oxide | 5 |
| Sulphur | 3.5 |
| Stearic acid | 1.5 |
| Hexamethylenetetramine benzyl mercaptobenzo thiazole | 1 |

This mix was vulcanized at a temperature corresponding to 30 lbs. steam pressure. The resulting vulcanized product gave the following results when tested:

| Cure | Stretch per cent | 400 per cent elongation | Tensile |
|---|---|---|---|
| Minutes | | | Lbs./sq.in. |
| 20 | 630 | 1500 | 3160 |
| 30 | 620 | 1700 | 3434 |
| 40 | 610 | 1800 | 3488 |

My accelerator not only makes possible the production in a very short curing time and at a low temperature of vulcanized rubber of great toughness, tensile strength, and resistance to abrasion when used alone, but tends to produce results of the same superior nature when used with other accelerators and rubber compounding ingredients. It produces better results and is more economical to use than hexamethylenetetramine or mercaptobenzothiazole.

The amount of my new accelerator necessary to be incorporated into the rubber to obtain the above described superior results will generally amount to less than 1% and more than ¼% of the weight of the rubber used. Less or greater amounts of accelerator than ¼ to 1% will, of course, give similar results, the exact amount for the best results depending upon the nature and amounts of the other ingredients of the mix to be vulcanized.

Claims:

1. The process for the preparation of the hexamethylenetetramine benzyl ester of mercaptobenzo thiazole which comprises reacting the addition product of benzyl chloride and hexamethylenetetramine with a metal salt of mercaptobenzo thiazole.

2. The process for the preparation of the hexamethylenetetramine benzyl ester of mercaptobenzo thiazole which comprises reacting the addition product of benzyl chloride and hexamethylenetetramine with the sodium salt of mercaptobenzo thiazole.

3. As a new composition of matter, the hexamethylenetetramine benzyl ester of mercapto benzo thiazole.

4. The process of preparing a rubber composition comprising vulcanizing rubber in the presence of the hexamethylenetetramine benzyl ester of mercaptobenzo thiazole.

5. Process for treating rubber or similar material which comprises combining with an unvulcanized rubber compound a vulcanizing agent and ¼% to 1% by weight, calculated on the weight of the rubber in the compound, of the product obtained by reacting hexamethylenetetramine benzyl chloride with a metal salt of mercaptobenzothiazole.

6. A rubber composition resulting from the vulcanization of a rubber mix comprising the product obtained when hexamethylenetetramine benzyl chloride is reacted with the sodium salt of mercaptobenzo thiazole.

Signed at London, England, this eighteenth day of July, A. D. 1929.

GEORGE STAFFORD WHITBY.